United States Patent
Kim et al.

(10) Patent No.: US 9,658,865 B2
(45) Date of Patent: May 23, 2017

(54) METHOD OF EDITING CONTENT AND ELECTRONIC DEVICE FOR IMPLEMENTING THE SAME

(71) Applicant: Samsung Electronics Co., Ltd., Gyeonggi-do (KR)

(72) Inventors: Youngkyoo Kim, Seoul (KR); Dongho Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 268 days.

(21) Appl. No.: 14/172,480

(22) Filed: Feb. 4, 2014

(65) Prior Publication Data

US 2014/0223298 A1    Aug. 7, 2014

(30) Foreign Application Priority Data

Feb. 4, 2013 (KR) ........................ 10-2013-0012145

(51) Int. Cl.
| | |
|---|---|
| *G06F 3/048* | (2013.01) |
| *G06F 9/44* | (2006.01) |
| *G06F 3/0488* | (2013.01) |
| *G06F 3/0484* | (2013.01) |

(52) U.S. Cl.
CPC .......... *G06F 9/4446* (2013.01); *G06F 3/0488* (2013.01); *G06F 3/04845* (2013.01); *G06F 3/04847* (2013.01); *G06F 2203/04806* (2013.01); *G06F 2203/04808* (2013.01)

(58) Field of Classification Search
CPC .... G06F 1/1684; G06F 1/3206; G06F 1/3234; G06F 1/3265; G06F 3/0481; G06F 3/0488; G06F 3/04842; G06F 3/04883; G06F 2203/04806
See application file for complete search history.

(56) References Cited

U.S. PATENT DOCUMENTS

| | | | |
|---|---|---|---|
| 2006/0253794 A1* | 11/2006 | Wilson ................... | G06Q 30/02 715/779 |
| 2009/0079700 A1* | 3/2009 | Abernathy .......... | G06F 3/04883 345/173 |
| 2010/0287493 A1* | 11/2010 | Majumder ............ | G06F 3/0481 715/788 |
| 2010/0333044 A1* | 12/2010 | Kethireddy ........... | G06F 3/0481 715/863 |
| 2011/0300910 A1* | 12/2011 | Choi ..................... | G06F 3/0482 455/566 |
| 2012/0030634 A1* | 2/2012 | Miyazaki ............ | G06F 3/04847 715/863 |

(Continued)

*Primary Examiner* — Di Xiao
(74) *Attorney, Agent, or Firm* — The Farrell Law Firm, P.C.

(57) ABSTRACT

A display device having a screen and a touch panel, and methods of enabling a user to edit content displayed on the screen using the touch panel, are described. In one aspect, a method of editing content in a display device having a touch panel installed in a screen includes displaying target content on the screen, displaying a guide on top of the target content in response to a trigger gesture by a touch input means on the target content, zooming the guide in response to a zooming gesture by the touch input means on the guide, and terminating the display of the zoomed guide and displaying the target content at the same magnification with the zoomed guide, in response to a release of contact of the touch input means on the guide.

8 Claims, 17 Drawing Sheets

(56) References Cited

U.S. PATENT DOCUMENTS

| 2012/0060114 A1* | 3/2012 | Chung | H04N 21/4438 |
| | | | 715/800 |
| 2013/0239049 A1* | 9/2013 | Perrodin | G06F 3/0481 |
| | | | 715/800 |
| 2014/0092130 A1* | 4/2014 | Anderson | G06F 3/04817 |
| | | | 345/632 |

* cited by examiner

FIG. 9A
FIG. 9B
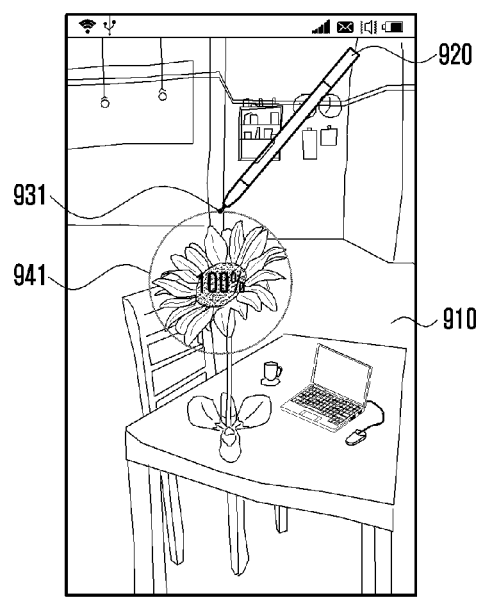
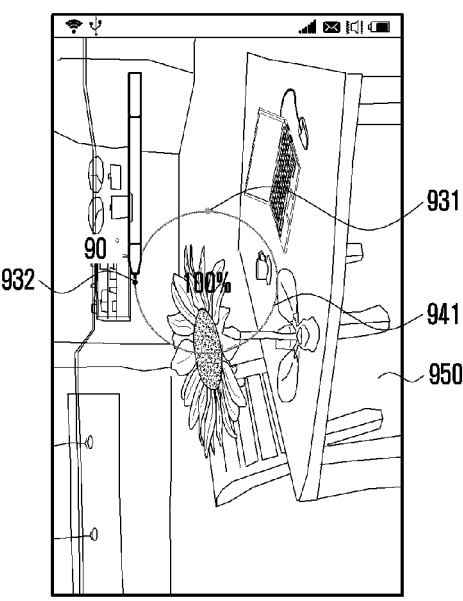

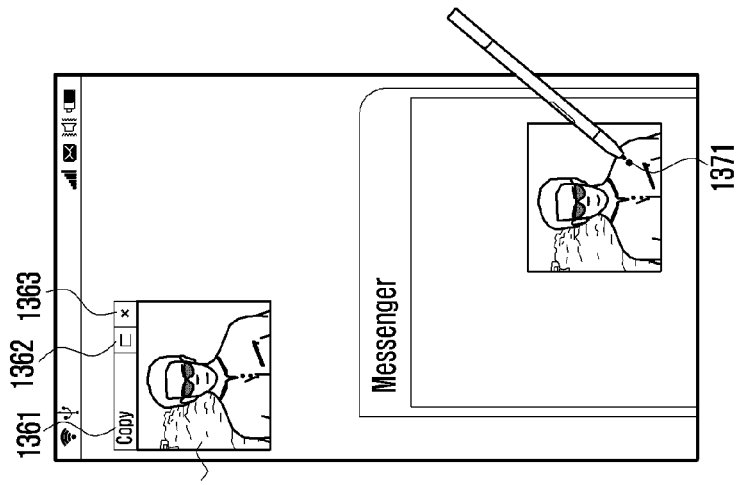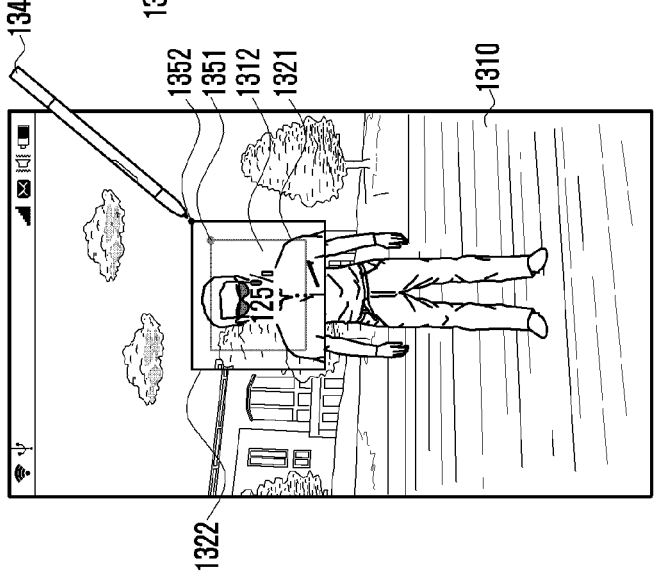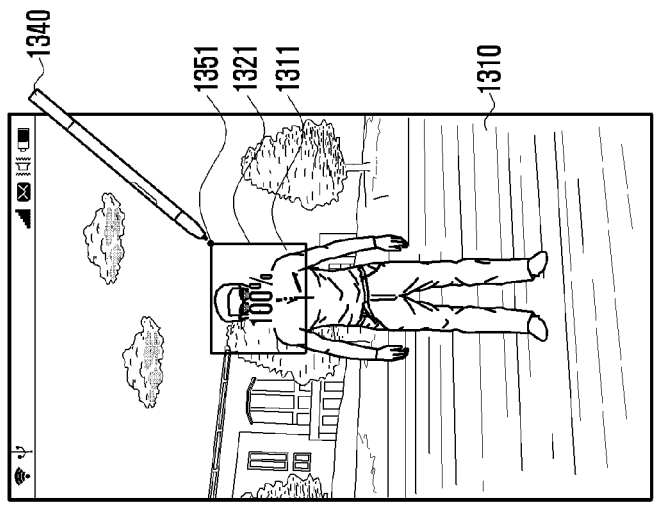

METHOD OF EDITING CONTENT AND ELECTRONIC DEVICE FOR IMPLEMENTING THE SAME

PRIORITY

This application claims priority under 35 U.S.C. §119(a) to a Korean Patent Application filed on Feb. 4, 2013 in the Korean Intellectual Property Office and assigned Serial No. 10-2013-0012145, the entire disclosure of which is incorporated herein by reference.

BACKGROUND OF THE INVENTION

1. Field of the Invention

The present invention relates generally to a display device having a touch panel, and more particularly, to a mobile terminal and a method of enabling a user to edit content displayed on a screen of the mobile terminal.

2. Description of the Related Art

A mobile terminal, such as, e.g., a smart phone or a tablet PC, now often includes a touch screen and executes various functions in response to a user's gesture on the touch screen. For example, a mobile terminal may edit (e.g., zoom, rotate, and copy and paste) content displayed on the touch screen in response to a user's gesture.

A method for reducing content in response to a user's pinch-in gesture on a screen and enlarging content in response to a user's pinch-out gesture on a screen has been proposed. This method, however, is problematic in that it cannot be implemented by way of a stylus pen. A method of reduction and enlargement using buttons displayed on the screen has also been proposed. This method, however, is problematic in that a user has to press a button several times in order to zoom content to a desired magnification. A method for rotating content based on the tilt of a screen as detected by a sensor has been proposed. This method, however, is problematic in that it is difficult for a user to recognize a desired rotation angle. A method for enlarging or reducing content based on the tilt of the screen as detected by a sensor when the screen has been touched has also been proposed. This method, however, is problematic in that content cannot be zoomed using a stylus pen.

SUMMARY

The present invention addresses at least the above problems and provides at least the advantages described below. According to one aspect of the present invention, a method of enabling a user to edit displayed content intuitively and conveniently and a display device for implementing the method are provided.

In accordance with an aspect of the present invention, a method of editing content in a display device having a touch panel installed in a screen includes displaying target content on the screen, displaying a guide on top of the target content in response to a trigger gesture of a touch input means on the target content, zooming the guide in response to a zooming gesture of the touch input means on the guide, and terminating the display of the zoomed guide and displaying the target content at a magnification identical to the zoomed guide, in response to a release of contact of the touch input means on the guide.

In accordance with another aspect of the present invention, a method of editing content in a display device having a touch panel installed in a screen includes displaying target content on the screen, displaying a guide on top of the target content in response to a trigger gesture by a touch input means on the target content, zooming the target content in response to a zooming gesture by the touch input means on the guide, and terminating the display of the guide in response to a release of contact of the touch input means on the guide.

In accordance with yet another aspect of the present invention, a method of editing content in a display device having a touch panel installed in a screen includes displaying target content on the screen, displaying a guide on top of the target content in response to a trigger gesture by a touch input means on the target content, determining a magnification and rotation angle for the target content using a point touched by the touch input means within the guide, and displaying the target content at the determined magnification and rotation angle.

In accordance with further yet another aspect of the present invention, a mobile terminal includes a display unit having a screen and a touch panel installed in the screen, the display unit configured to display target content on the screen, and a control unit configured to control the display unit so that a guide is displayed on top of the target content in response to a trigger gesture by a touch input means on the target content, to control the display unit so that the guide is zoomed in response to a zooming gesture by the touch input means on the guide, and to control the display unit so that the display of the zoomed guide is terminated and the target content is displayed at a magnification identical to the zoomed guide in response to a release of contact of the touch input means on the guide.

In accordance with further yet another aspect of the present invention, a mobile terminal includes a display unit having a screen and a touch panel installed in the screen, the display unit configured to display target content on the screen, and a control unit configured to control the display unit so that a guide is displayed on top of the target content in response to a trigger gesture by a touch input means on the target content, to control the display unit so that the target content is zoomed in response to a zooming gesture by the touch input means on the guide, and to control the display unit so that the display of the guide is terminated in response to a release of contact of the touch input means on the guide.

In accordance with further yet another aspect of the present invention, a mobile terminal includes a display unit having a screen and a touch panel installed in the screen, the display unit configured to display target content on the screen, and a control unit configured to control the display unit so that a guide is displayed on top of the target content in response to a trigger gesture by a touch input means on the target content, to determine a magnification and rotation angle for the target content using a point contacted by the touch input means within the guide, and to control the display unit so that the target content is displayed at the determined magnification and rotation angle.

BRIEF DESCRIPTION OF THE DRAWINGS

The above aspects, features, and advantages of the present invention will be more apparent from the following detailed description, taken in conjunction with the accompanying drawings, in which:

FIGS. 9A-9B are screens illustrating the image rotation method in FIG. 8 in accordance with another embodiment of the present invention;

FIGS. 13A-13C are screens illustrating the method of setting the 'ALWAYS-VIEW-AT-THE-TOP' function in accordance with an embodiment of the present invention.

DETAILED DESCRIPTION OF EMBODIMENTS OF THE PRESENT INVENTION

Embodiments of the present invention will now be described more fully with reference to the accompanying drawings. However, the embodiments do not limit the present invention to a specific implementation, but should be construed as including all modifications, equivalents, and replacements included within the scope of the present invention, as defined in the appended claims and their equivalents.

Terms or words used hereinafter should not be construed as having common or dictionary meanings, but should be construed as having meanings and concepts that comply with the technical field of the present invention. Accordingly, the following description and drawings illustrate embodiments of the present invention and do not limit the scope of the present invention. It would be understood by one of ordinary skill in the art that a variety of equivalents and modifications of the embodiments exist. Furthermore, in the accompanying drawings, some elements are illustrated as being enlarged and are illustrated schematically, and the size of each element does not accurately reflect its real size. Accordingly, the present invention is not restricted by the relative sizes or spaces that are drawn in the figures. A detailed description of known functions or constructions related to the present invention will be omitted where such a description would obscure the present invention in unnecessary detail.

A method of editing content according to an embodiment of the present invention can be implemented in a display device having a touch panel, in particular, a mobile terminal. The mobile terminal can be a smart phone, a tablet PC, a display device, a navigator, a video play device, and the like.

Figure 1:
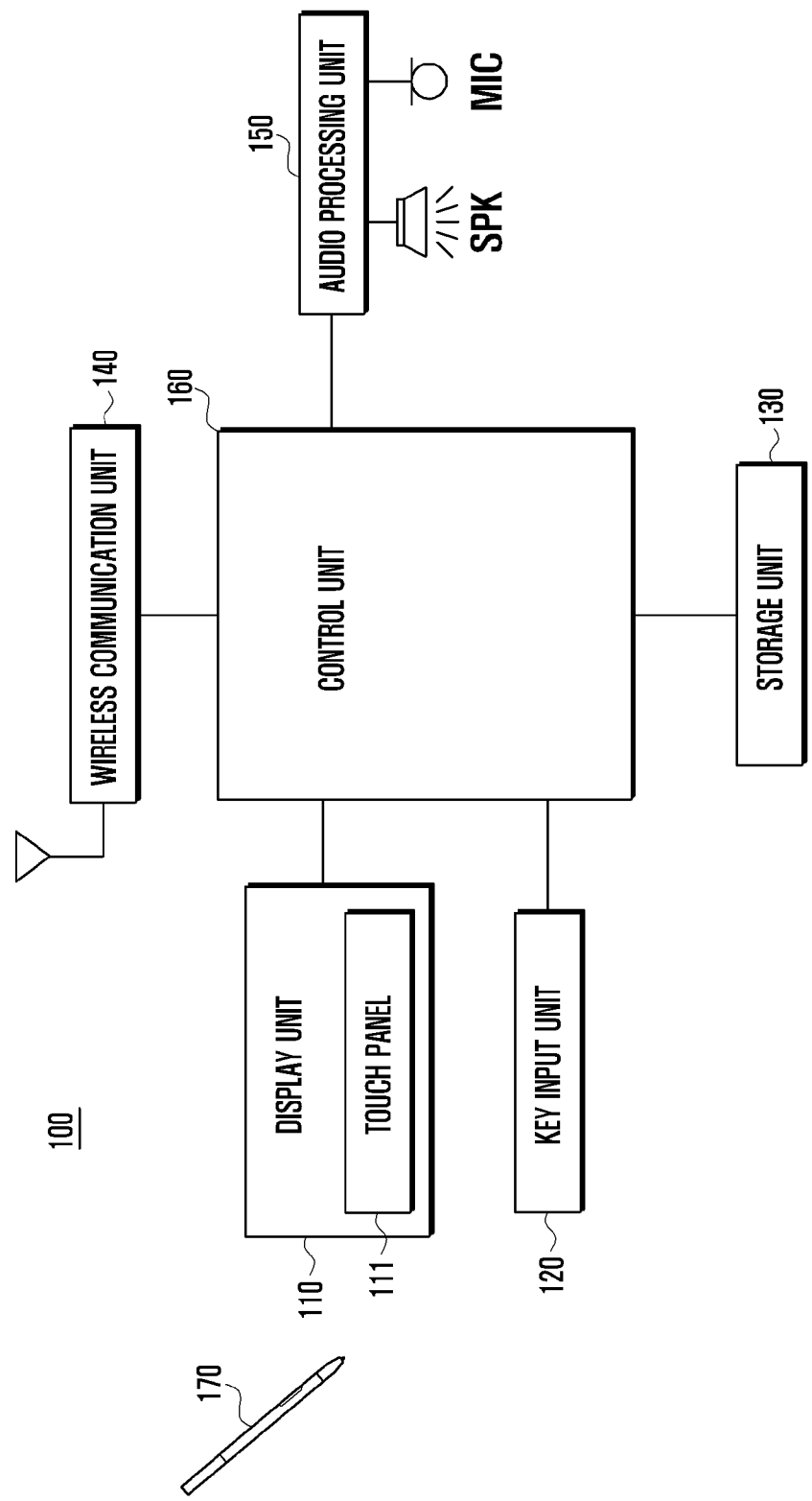
FIG. 1 is a block diagram of a mobile terminal in accordance with an embodiment of the present invention.

FIG. 1 is a block diagram of a mobile terminal in accordance with an embodiment of the present invention.

Referring to FIG. 1, the mobile terminal 100 in accordance with an embodiment of the present invention includes a display unit 110, a key input unit 120, a storage unit 130, a wireless communication unit 140, an audio processing unit 150, a speaker SPK, a microphone MIC, a control unit 160, and a touch input pen 170, such as a stylus pen.

The display unit 110 displays content on a screen under the control of the control unit 160. That is, when the control unit 160 processes (e.g., decodes and resizes) content and stores the processed data in a buffer, the display unit 110 converts the content stored in the buffer into an analog signal and displays the converted content on a screen. When power is supplied to the display unit 110, the display unit 110 displays a locked image (so-called login image) on a screen. When unlocking information (i.e., password) is detected in the state in which the locked image is displayed, the control unit 160 unlocks the screen. That is, the display unit 110 terminates the display of the locked image and displays another piece of content under the control of the control unit 160. The other piece of content can be a home image, an application execution image (e.g., a home page or a game image), or a menu. The home image may include a background image and a plurality of icons displayed on the background image. The icons indicate respective applications or pieces of content (e.g., photos, videos, documents, and messages). When a user selects one of the icons, for example, an application icon (e.g., by tapping the icon), the control unit 160 executes the corresponding application (e.g., photograph application) and controls the display unit 110 so that an image corresponding to the execution of the application (e.g., photograph) is displayed.

The display unit 110 displays pieces of content on a screen in a multi-layer form under the control of the control unit 160. For example, the display unit 110 can display first content (e.g., home image) on a screen and display second content (e.g., message write window) in a layer over, i.e., on top of, the first content. Here, a region in which the first content is displayed can be the entire screen, and a region in which the second content is displayed can be a portion of the screen. Accordingly, a user can view the second content and can also view some of the first content but not the entire first content. In another embodiment, the display unit 110 can display the second content on the entire screen under the control of the control unit 160. In this case, the second content can be displayed less than opaquely so that a user can view the entire first content through the second content.

If specific content (e.g., edited photograph) is set as 'ALWAYS-VIEW-AT-THE-TOP', the display unit 110 displays the specific content at the highest layer of a screen under the control of the control unit 160. That is, the specific content is always displayed on the screen until the supply of power to the display unit 110 is stopped or the setting of 'ALWAYS-VIEW-AT-THE-TOP' is released. For example, a web browser is executed by a user, and a web page is displayed on a screen when the web browser is executed. If the web page overlaps with specific content set as 'ALWAYS-VIEW-AT-THE-TOP', the control unit 160 controls the display unit 110 so that the specific content is displayed at the top of the web page. The display unit 110 displays first content (e.g., edited photograph) in a first region of a screen and displays second content (e.g., message write window) in a second region of the screen that does not overlap with the first region under the control of the control unit 160.

The display unit 110 may be a Liquid Crystal Display (LCD), Organic Light Emitted Diodes (OLED), Active Matrix Organic Light Emitted Diodes (AMOLED), or a flexible display.

A touch panel 111 is installed in a screen of the display unit 110. Specifically, the touch panel 111 can have an add-on type in which the touch panel 111 is placed in a screen of the display unit 110 or an on-cell type or an in-cell type in which the touch panel 111 is inserted into the display unit 110.

The touch panel 111 generates an analog signal (e.g., touch event) in response to a touch on a screen using a touch input means (e.g., finger or pen), converts the analog signal into a digital signal, and transfers the digital signal to the control unit 160. The touch event includes touch coordinates (x, y). For example, the controller of the touch panel 111 can determine representative touch coordinates from among a plurality of touch coordinates and transfer the determined touch coordinates to the control unit 160. This control may be performed by the control unit 160. The touch coordinates can be in units of pixels. For example, if a screen has resolution of 640×480 (i.e., the number of pixels in length x the number of pixels in breadth), X-axis coordinates are in the range (0, 640) and Y-axis coordinates are in the range (0, 480). The control unit 160 determines that a touch input means (e.g., finger or pen) has touched the touch panel 111 when touch coordinates are received from the touch panel 111 and determines that a touch on the touch input means has been released when touch coordinates are not received from the touch panel 111.

Furthermore, if touched coordinates are changed, for example, from (x0, y0) to (x1, y2) and the amount of change (e.g., D where $D^2=(x0-x1)^2+(y0-y1)^2$) exceeds a predetermined movement threshold (e.g., 1 mm), the control unit 160 determines that the touch input means has been moved. In response to the movement of the touch input means, the control unit 160 calculates a change of the location (dx, dy) of the touch input means and the speed of movement of the touch input means.

The control unit 160 determines a user's gesture to a screen as any one of a touch, a multi-touch, a tap, a double tap, a long tap, a tap & touch, a drag, flick, press, pinch in, and pinch out based on touch coordinates, whether or not a touch on the touch input means has been released, whether or not the touch input means has been moved, a change of the location of the touch input means, and the speed of movement of the touch input means. The touch is a gesture in which a user touches any one point of the touch panel 111 on a screen using the touch input means. The multi-touch is a gesture in which a user touches several points of the touch panel 111 on a screen using a plurality of touch input means (e.g., the thumb and the index finger).

The tap is a gesture in which a user touches any one point on a screen using the touch input means and the touch is released from the point without a movement. The double tap is a gesture in which a user taps any one point on a screen consecutively twice using the touch input means. The long tap is a gesture in which a user touches any one point on a screen relatively longer than a tap using the touch input means and the touch is released from the point without a movement. The tap & touch is a gesture in which a user taps any one point on a screen and touches the point again within a specific time (e.g., 0.5 second).

The drag is a gesture in which a user moves the touch input means in a specific direction from any one point touched on a screen. The flick is a gesture in which a user moves the touch input means faster than the drag and then releases the touch (i.e., releases contact with the touch screen). The press is a gesture in which a user touches any one point on a screen and maintains the touch for a specific time (e.g., 2 seconds) or higher. The pinch in is a gesture in which a user touches two points on a screen at the same time using two touch input means and then narrows the interval between the two touch points. The pinch out is a gesture in which a user touches two points on a screen at the same time using two touch input means and then widens the interval between the two touch points.

The touch panel 111 can be a complex touch panel that includes a hand touch panel for sensing a hand gesture and a pen touch panel for sensing a pen gesture. The hand touch panel in this embodiment is a capacitive type. In other embodiments, the hand touch panel may be a resistive type, an infrared type, or an ultrasonic type. Furthermore, the hand touch panel does not generate a touch event in response to a hand gesture only, but can also generate a touch event in response to another object (e.g., an object made of conductive materials and capable of applying a change of capacitance). The pen touch panel may be capable of electromagnetic induction. In this case, the pen touch panel generates a touch event in response to a pen 170 that is specially manufactured to form a magnetic field. In particular, a touch event generated from the pen touch panel may include touch coordinates and a value indicative of the type of touch. For example, when a first voltage level value is received from the pen touch panel, the control unit 160 determines a touch on the touch input means as an indirect touch (so-called hovering). For another example, when a second voltage level value higher than a first voltage level value is received from the touch panel 111, the control unit 160 determines a touch on the touch input means as a direct touch. A touch event generated from the pen touch panel can further include a value indicating whether or not a button installed in the pen 170 has been pressed. For example, when the button installed in the pen 170 is pressed, a magnetic field generated from the coil of the pen 170 is changed. The pen touch panel generates a third voltage level value in response to a change of the magnetic field and transfers the third voltage level value to the control unit 160.

The key input unit 120 can include a plurality of keys for receiving numerical or alphabetic information and setting various functions. The keys can include a menu import key, a screen on/off key, a power on/off key, and a volume control key. The key input unit 120 generates a key event that is related to user setting and control of a function of the mobile terminal 100 and transfers the key event to the control unit 160. The key event can include a power on/off event, a volume control event, a screen on/off event, and a shutter event. The control unit 160 controls the elements in response to the key event. The keys of the key input unit 120 can be called hard keys, and virtual keys displayed on the display unit 110 can be called soft keys.

The storage unit 130 can be a disk, RAM, ROM, or flash memory. The storage unit 130 stores content that is generated from the mobile terminal 100 or received from an external device (e.g., server, desktop PC, or tablet PC) through the wireless communication unit 140 under the control of the control unit 160.

The storage unit 130 stores a boot program and one or more operating systems and applications. The operating system functions as an interface between hardware and an application and between applications and manages computer resources, such as a CPU, a GPU, a main memory unit, and the storage unit 130. The applications are divided into embedded applications and third party applications. For example, the embedded applications can include a web browser, an e-mail program, and an instant messenger. When power is supplied to the battery of the control unit 160, first, the boot program is loaded onto the main memory unit of the control unit 160. The boot program loads the operating system onto the main memory unit. The operating system loads applications onto the main memory unit.

The wireless communication unit 140, together with an external device, can perform a voice call, a video call, or data communication over a network under the control of the control unit 160. The wireless communication unit 140 includes a radio frequency transmitter for performing up-conversion and amplification on a frequency of a transmitted signal and a radio frequency receiver for performing low-noise amplification and down-conversion on a frequency of a received signal. The wireless communication unit 140 further includes a mobile communication module (e.g., 3rd-generation mobile communication module, 3.5th-generation mobile communication module, or 4th-generation mobile communication module), a digital broadcasting module (e.g., a Digital Multimedia Broadcasting (DMB) module), and short-range communication modules (e.g., Wi-Fi module, Bluetooth module, and Near Field Communication (NFC) module).

The audio processing unit 150 performs the input and output of an audio signal (e.g., voice data) for voice recognition, voice recording, digital recording, and a call while operating in conjunction with the speaker SPK and the microphone MIC. The audio processing unit 150 receives an audio signal from the control unit 160, performs D/A conversion on the received digital audio signal, amplifies the resulting analog signal, and outputs the amplified signal to the speaker SPK. The audio processing unit 150 performs A/D conversion on an audio analog signal received from the microphone MIC and provides the converted digital signal to the control unit 160. The speaker SPK converts an audio signal, received from the audio processing unit 150, into sound waves and outputs the sound waves. The microphone MIC converts sound waves, received from a person or other sound sources, into an audio signal.

The control unit 160 controls the overall operation of the mobile terminal 100 and a flow of signals between the internal elements of the mobile terminal 100, performs a function of processing data, and controls the supply of power from the battery to the elements. In particular, the control unit 160 according to this invention detects a gesture of a touch input means from the touch panel 111 and edits content in response to the gesture.

The control unit 160 includes one or more Central Processing Units (CPUs). As known, the CPU is the core control unit of a computer system for performing operations on and analyses of data, the interpretation and execution of commands, etc. The CPU includes various types of registers for temporarily storing data or commands. The control unit 160 can include one or more Graphic Processing Units (GPUs). The GPU is a graphic control unit for performing the operations on and analyses of data related to graphics, the interpretation and execution of commands related to graphics, etc. instead of the CPU. Each of the CPU and the GPU can be integrated into one package in which two or more independent cores (e.g., quad-core) are integrated into a single IC. That is, the CPUs can be integrated into one multi-core processor, and a plurality of the GPUs can also be integrated into one multi-core processor. Furthermore, the CPU and the GPU can be integrated into one chip (i.e., System on Chip (SoC)). Furthermore, the CPU and the GPU can be in a multi-layer package. A component including the CPU and the GPU can be called an Application Processor (AP).

The control unit 160 includes a main memory unit, for example, RAM. The main memory unit stores various types of programs, for example, a boot program, operating systems, and applications loaded from the storage unit 130. That is, the CPUs and GPUs of the control unit 160 access a program, interprets the command of the program, and executes a function based on a result of the interpretation. In particular, at least one of the CPUs executes the editing of content. Furthermore, the control unit 160 includes cache memory for temporarily storing data to be written into the storage unit 130 and temporarily storing data read from the storage unit 130.

The pen 170 is an accessory of the mobile terminal 100 which can be separated from the mobile terminal 100 includes a pen body, a pen point disposed at the end of the pen body, a coil disposed within the pen body near the pen point and configured to generate a magnetic field, and a button configured to change the magnetic field. The coil of the pen 170 forms a magnetic field around the pen point. The touch panel 111 senses a magnetic field and generates a touch event corresponding to the magnetic field.

The mobile terminal 100 can further include elements that have not been described above, such as an ear phone jack, a Global Positioning System (GPS) module, a vibration motor, and accessories.

Figure 2:
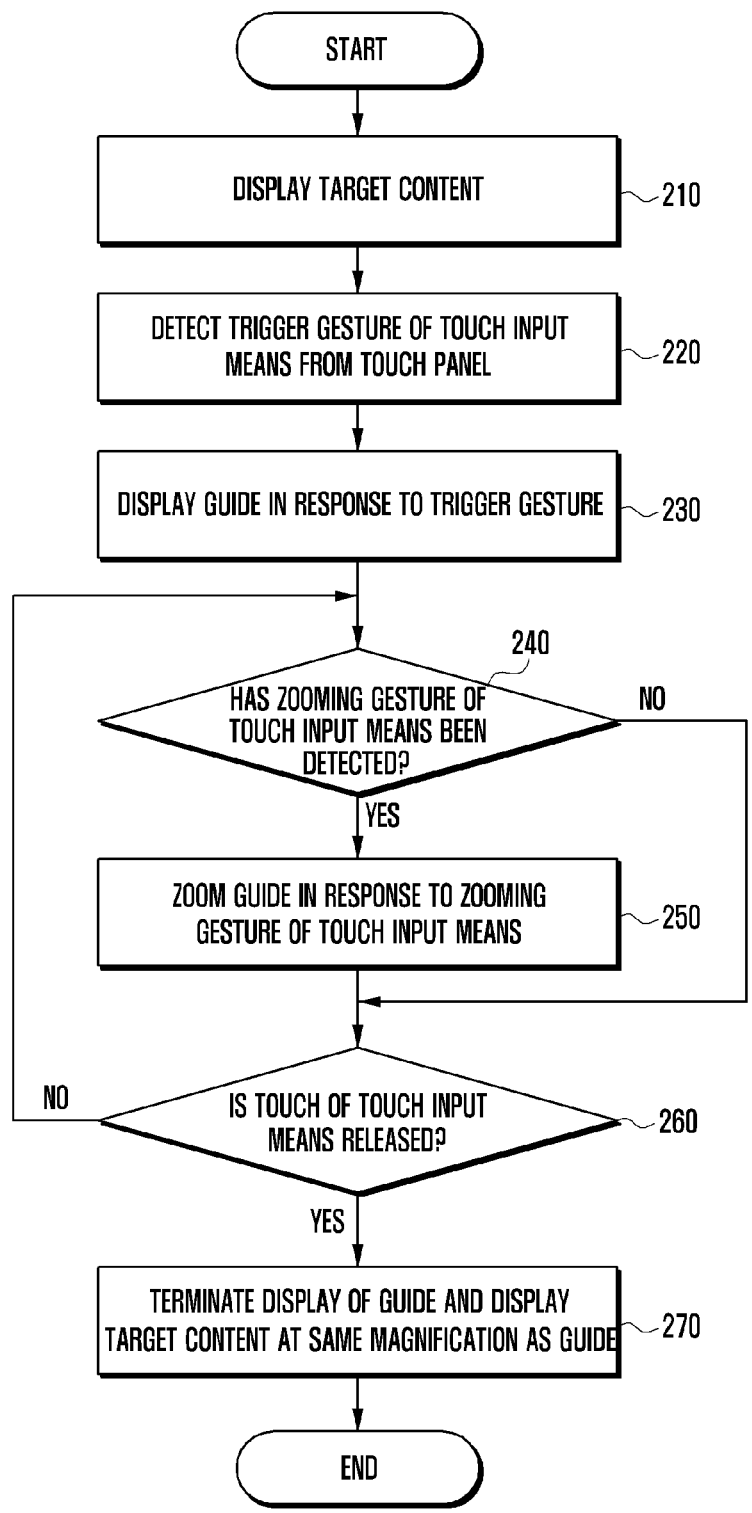
FIG. 2 is a flowchart illustrating an image zooming method in accordance with an embodiment of the present invention.

FIG. 2 is a flowchart illustrating an image zooming method in accordance with an embodiment of the present invention, and FIGS. 3A-3E are screens illustrating the image zooming method in FIG. 2 in accordance with an embodiment of the present invention.

Figure 3A:
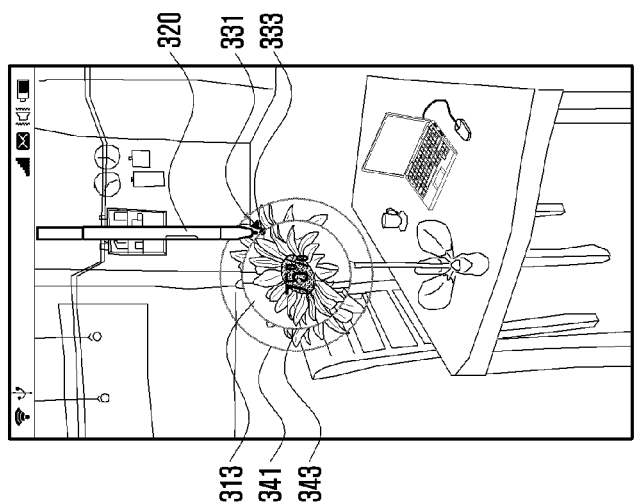
FIGS. 3A-3E are screens illustrating the image zooming method in FIG. 2 in accordance with an embodiment of the present invention.

Referring to FIGS. 2 and 3A-3E, at step 210, the control unit 160 controls the display unit 110 so that target content is displayed. Referring to FIG. 3A, a photograph 310 is target content. Content other than the photograph 310, such as a web page, a home image, a message, text, or thumbnail, can be target content.

At step 220, the control unit 160 detects a trigger gesture to the target content using a touch input means from the touch panel 111. Referring to FIG. 3A, the touch input means is a pen 320, and the trigger gesture is a tap & long touch, a double tap, a tap & touch, a multi-touch, a long touch, or a gesture of drawing a circle. In another embodiment, a finger can be the touch input means.

At step 230, the control unit 160 controls the display unit 110 so that a guide is displayed in response to the trigger gesture. Referring to FIG. 3A, the guide includes the frame (also called the outline or boundary line) 341 of the guide and reference magnification information (e.g., 100%). That is, in response to the trigger gesture, the control unit 160 controls the display unit 110 so that the frame 341, in which the touch (or contact) point 331 is one point on the circumference, is displayed. Furthermore, the control unit 160 controls the display unit 110 so that magnification information "100%" is displayed within the frame 341.

When a gesture is detected from the touch panel 111 after the guide is displayed, the control unit 160 determines whether or not the detected gesture is a zooming gesture at step 240. The zooming gesture is a gesture in which the touch input means approaches the center of the guide or moves from the center of the guide. Referring to FIG. 3A, a gesture in which the pen point 331 of the pen 320 moves into the frame 341 is a zoom-out (reduction) gesture, and a gesture in which the pen point 331 of the pen 320 moves out of the frame 340 is a zoom-in (enlargement) gesture. If the detected gesture is not a zooming gesture, the method jumps to step 260.

Figure 3B:
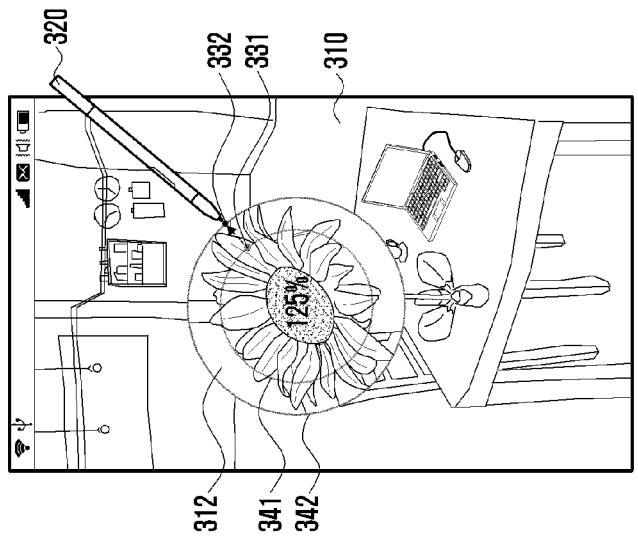

In response to the zooming gesture detected in step 240, the control unit 160 controls the display unit 110 so that the guide is zoomed at step 250. That is, if the detected gesture is a zoom-in gesture, the control unit 160 enlarges the guide. Referring to FIG. 3B, if the pen point of the pen 320 moves out of the frame 341 from point 331 to point 332, the control unit 160 controls the display unit 110 so that a new frame 342, in which point 332 is one point on the circumference, is displayed. Furthermore, the control unit 160 generates a copy of the portion 311 of the photograph within the first frame 341 as shown in FIG. 3A and enlarges the generated copy to a second copy 312 having the same area as that of the inside of the second frame 342 as shown in FIG. 3B. Furthermore, the control unit 160 controls the display unit 110 so that the second copy 312 is displayed on top of the photograph 310. Furthermore, the control unit 160 controls the display unit 110 so that magnification information "125%" of the second copy 312 is displayed within the first frame 341.

If the touch point is changed from any one point (e.g., 332) on the second frame 342 to any point (e.g., 331) on the first frame 341, a guide, such as that of FIG. 3A, is displayed. That is, when a gesture in which a touch point is changed from any one point on the second frame 342 to any one point of the first frame 341 is detected from the touch panel 111, the display unit 110 terminates the display of the second frame 342, reduces the second copy 312, displays the reduced second copy 312 within the first frame 341, and displays magnification information "100%" within the first frame 341, under the control of the control unit 160.

Figure 3C:
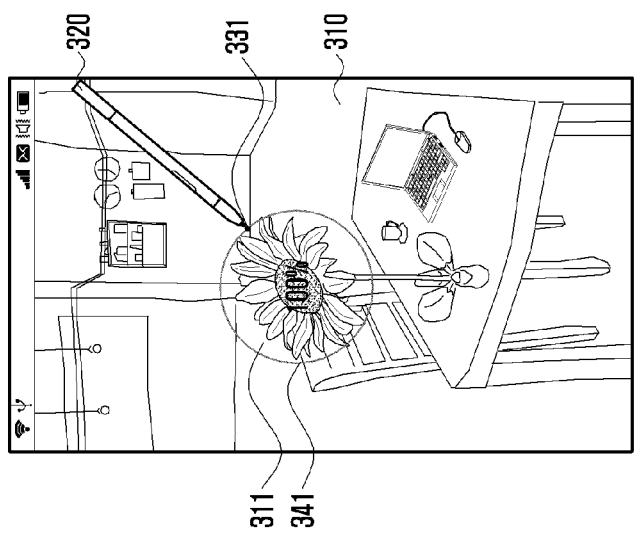

If the detected gesture in step 340 is a zoom-out gesture, the guide is reduced in step 350. Referring to FIG. 3C, when the pen point 331 of the pen 320 moves into the frame 341 to point 333, the control unit 160 controls the display unit 110 so that a new frame 343, in which point 333 is one point on the circumference, is displayed. Furthermore, the control unit 160 generates a copy of the portion 311 of the photograph 310 within the first frame 341 (as shown in FIG. 3A) and reduces the generated copy to a third copy 313 having the same area as that of the inside of the third frame 343 as shown in FIG. 3C. Furthermore, the control unit 160 controls the display unit 110 so that the third copy 313 is displayed. Furthermore, the control unit 160 controls the display unit 110 so that magnification information "75%" about the third copy 313 is displayed within the first frame 341.

If a touch point is changed from any one point (e.g., 333) of the third frame 343 to any point (e.g., 331) on the first frame 341, a guide, such as that of FIG. 3A, is displayed. That is, when a gesture in which a touch point is changed from any one point on the third frame 343 to any one point of the first frame 341 is detected from the touch panel 111, the display unit 110 terminates the display of the third frame 343, enlarges the third copy 313, displays the enlarged third copy 313 within the first frame 341, and displays magnification information "100%" within the first frame 341, under the control of the control unit 160.

At step 260, the control unit 160 determines whether or not the touch or contact of the touch input means is released. If, as a result of the determination, it is determined that the touch or contact of the touch input means is not released, the method jumps back to step 240. If it is determined that the touch or contact of the touch input means is released in step 260, the control unit 160 controls the display unit 110 so that the display of the guide is terminated and the target content is displayed with the same magnification as that of the guide at step 270.

Figure 3D:
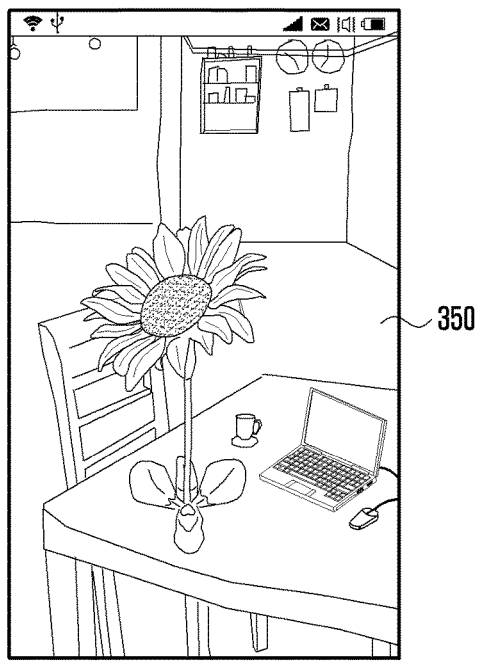
Figure 3E:
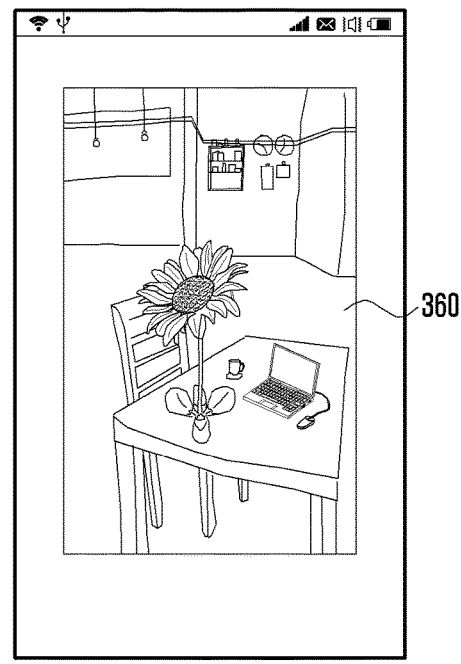

More specifically concerning step 270, referring to FIGS. 3B and 3D, if the touch or contact of the pen point of the pen 320 is released from the second touch point 332 in FIG. 3B, the control unit 160 controls the display unit 110 so that the display of the frames 341 and 342 and the second copy 312 is terminated. Furthermore, the control unit 160 controls the display unit 110 so that the photograph 310 is enlarged to a second photograph 350 by the same enlargement magnification as that from the first frame 341 to the second frame 342 and the second photograph 350 is displayed as shown in FIG. 3D. Referring to FIGS. 3C and 3E, if the touch of the pen point of the pen 320 is released from the third touch point 333 in FIG. 3C, the control unit 160 controls the display unit 110 so that the display of the frames 341 and 343 and the third copy 313 is terminated. Furthermore, the control unit 160 controls the display unit 110 so that the photograph 310 is reduced to a third photograph 360 by the same reduction magnification as that from the first frame 341 to the third frame 343 and the third photograph 360 is displayed as shown in FIG. 3E.

Figure 3F:
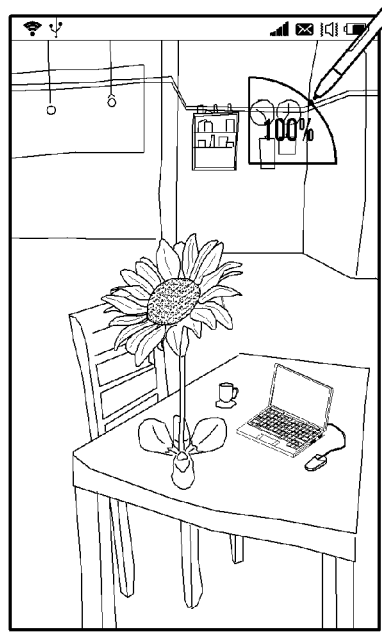
FIGS. 3F-3I are screens illustrating frames and gestures used in the image zooming methods in accordance with embodiments of the present invention.
Figure 3G:
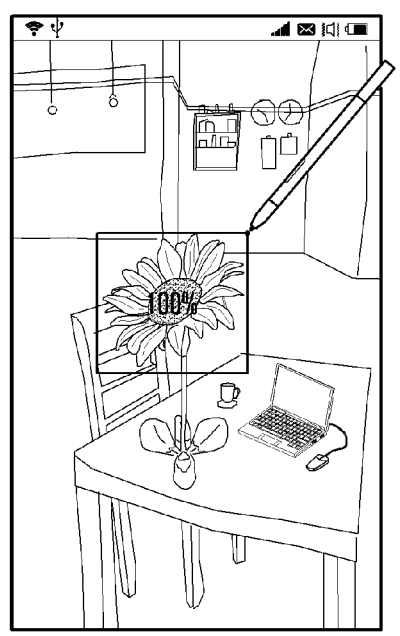
Figure 3H:
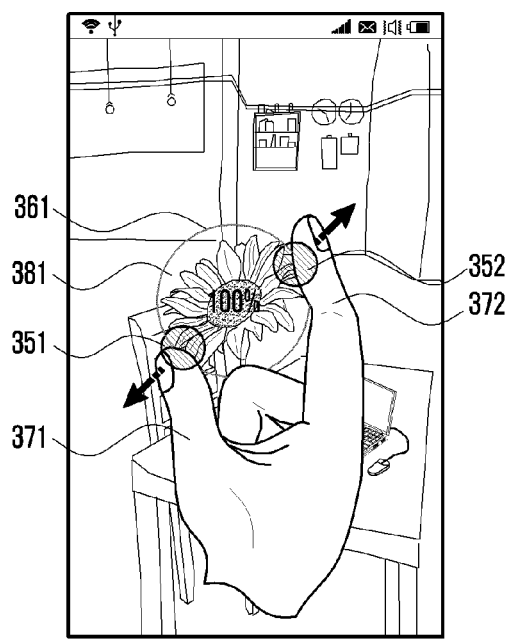
Figure 3I:
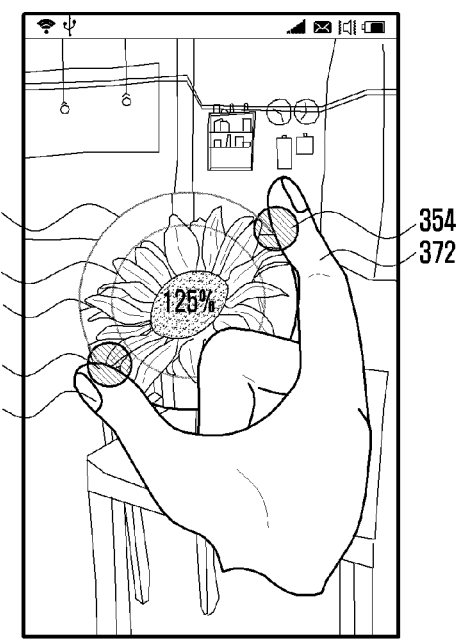

Although the frame of the guide has been illustrated as a circle in FIGS. 3A to 3E, the frame according to the present invention is not limited to such a shape. That is, a frame displayed when a trigger gesture is detected can have various shapes. For example, when a trigger gesture is detected, a fan shape, such as that shown in FIG. 3F, can be displayed. For another example, when a trigger gesture is detected, a square shape, such as that shown in FIG. 3G, can be displayed. Furthermore, if a touch input means is a finger, a multi-touch, a multi-tap & touch, or a multi-tap & long touch can be the trigger gesture. For example, referring to FIGS. 3H and 3I, when a first touch point 351 and a second touch point 352 are detected, a first circle 361 and magnification information "100%" can be displayed. If a pinch-out gesture in which the thumb 371 is moved from the first touch point 351 to a third touch point 353 and the index finger 372 is moved from the second touch point 352 to a fourth touch point 354 is detected, an image 381 within the first circle 361 is enlarged by the same area as that of a second circle 362, and the enlarged image 281 is displayed. Furthermore, magnification information about the enlarged image 382 is displayed within the first circle 361.

Figure 4:
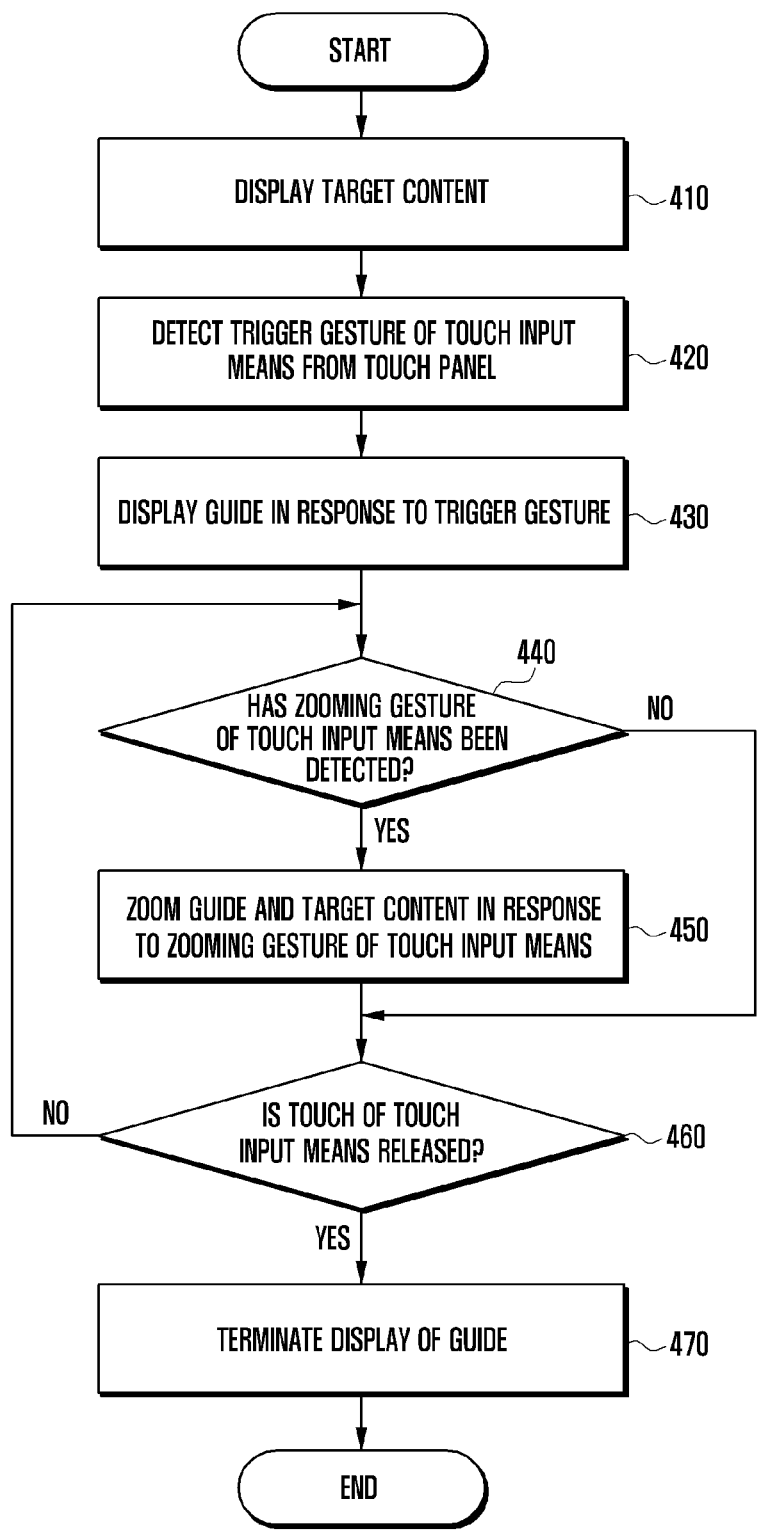
FIG. 4 is a flowchart illustrating an image zooming method in accordance with another embodiment of the present invention.
Figure 5A:
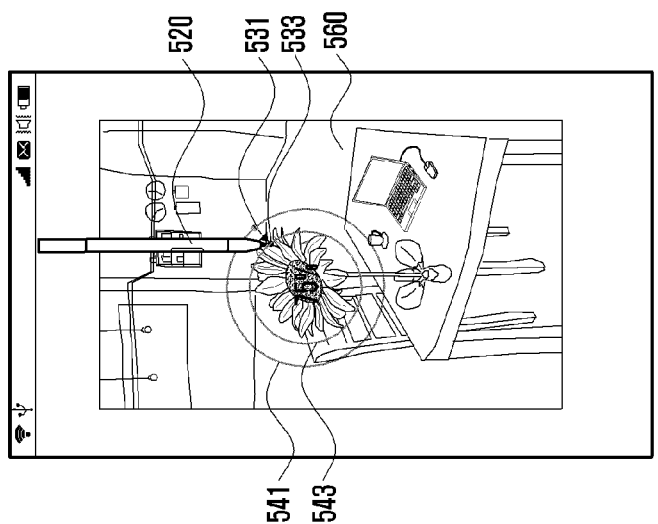
FIGS. 5A-5C are screens illustrating the image zooming method in FIG. 4 in accordance with another embodiment of the present invention.
Figure 5B:
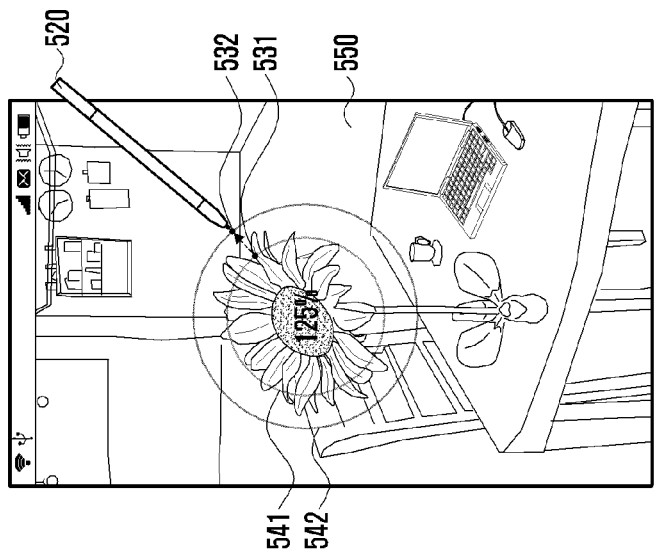
Figure 5C:
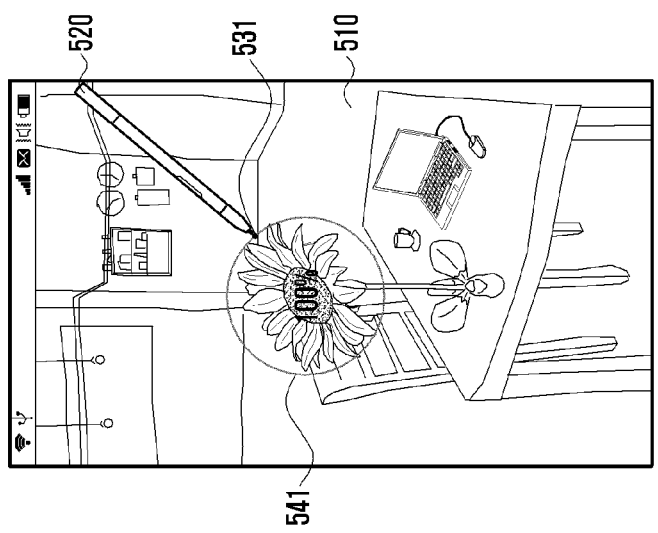

FIG. 4 is a flowchart illustrating an image zooming method in accordance with another embodiment of the present invention, and FIGS. 5A-5C are screens illustrating the image zooming method in FIG. 4 in accordance with another embodiment of the present invention.

Referring to FIGS. 4 and 5A-5C, at step 410, the control unit 160 controls the display unit 110 so that target content, for example, a photograph 510, such as that shown in FIG. 5A, is displayed.

At step 420, when a tap & long touch is detected from the touch panel 111, the control unit 160 determines that a trigger gesture has been generated.

At step 430, the control unit 160 controls the display unit 110 so that a guide is displayed. Referring to FIG. 5A, the guide includes a frame 541, in which a point 531 touched by the pen point of a pen 520 is one point on the circumference of the frame, and reference magnification information (e.g., 100%) displayed within the frame 541.

When a gesture is detected from the touch panel 111 after the guide is displayed, the control unit 160 determines whether or not the detected gesture is a zooming gesture at operation 440. If it is determined the detected gesture is not a zooming gesture, the method jumps to step 460.

If it is determined that the detected gesture is a zooming gesture in step 440, the control unit 160 controls the display unit 110 so that the guide and target content are zoomed at step 450. Referring to FIG. 5B, when the pen point 531 of the pen 520 moves out of the frame 541 to point 532, the control unit 160 controls the display unit 110 so that a new frame 542, in which point 532 is one point on the circumference of the new frame, is displayed. Furthermore, the control unit 160 controls the display unit 110 to display a second photograph 550 which comprises the first photograph 510 enlarged by the same enlargement magnification as that from the first frame 541 to the second frame 542. Furthermore, the control unit 160 controls the display unit 110 so that magnification information (e.g., 125%) about the second photograph 550 is displayed within the first frame 541.

Referring to FIG. 5C, when the pen point 531 of the pen 520 moves into the frame 541 to point 533, the control unit 160 controls the display unit 110 so that a new frame 543, in which point 533 is a point on the circumference, is displayed. Furthermore, the control unit 160 controls the display unit 110 to display a third photograph 560 comprising the first photograph 510 reduced by the same reduction magnification as that from the first frame 541 to the third frame 543. Furthermore, the control unit 160 controls the display unit 110 so that magnification information (e.g., 75%) about the third photograph 560 is displayed within the first frame 541.

At step 460, the control unit 160 determines whether or not the touch or contact of the touch input means is released. If it is determined in step 460 that the contact or touch of the touch input means is not released, the method jumps back to step 440. If it is determined that the touch or contact of the touch input means is released, the control unit 160 terminates the display of the guide at step 470.

Figure 6:
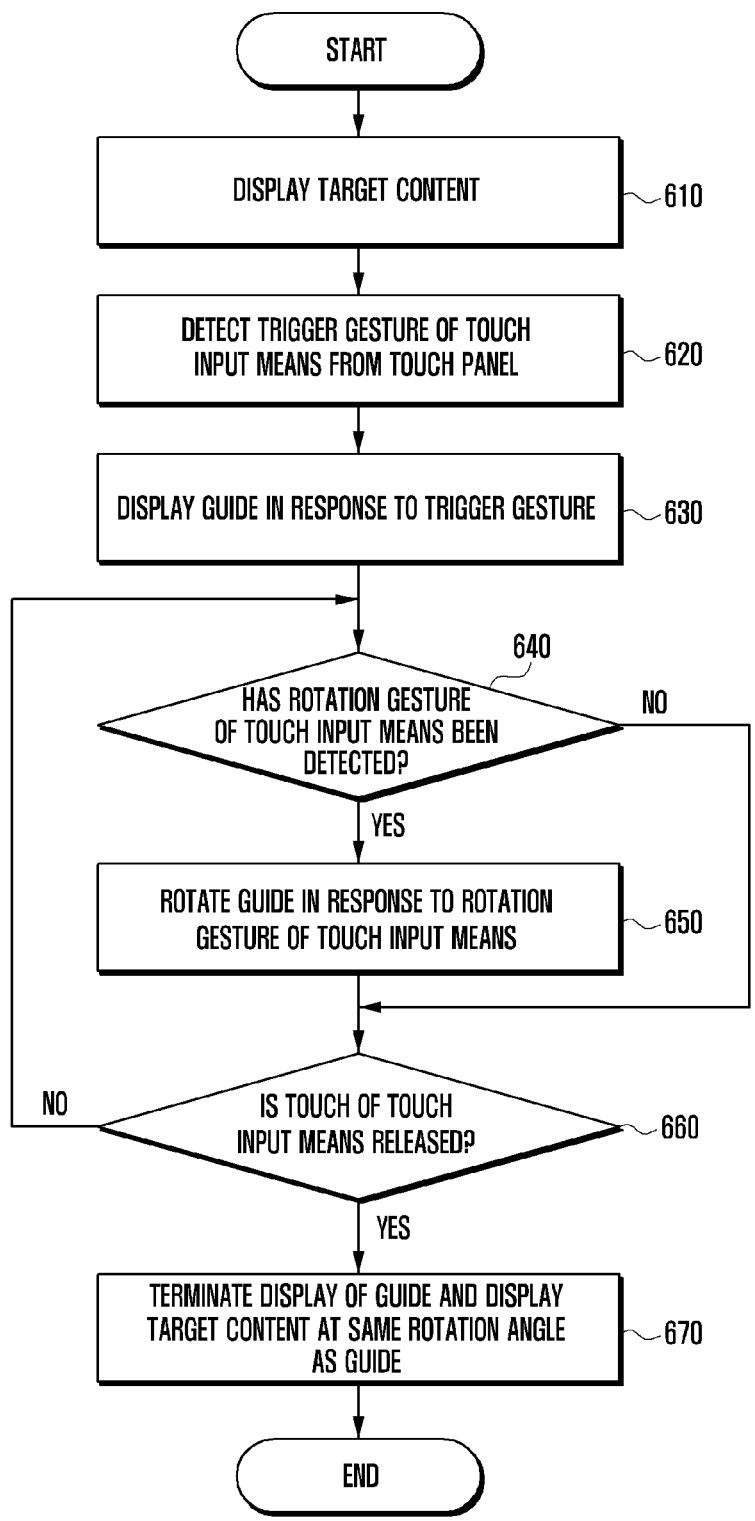
FIG. 6 is a flowchart illustrating an image rotation method in accordance with an embodiment of the present invention.
Figure 7C:
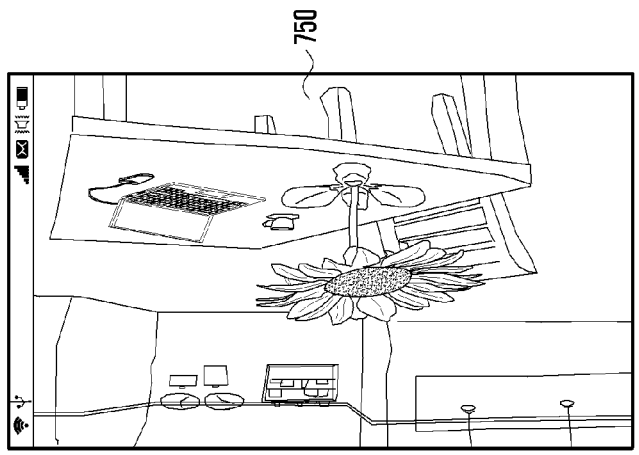
FIGS. 7A-7C are screens illustrating the image rotation method in FIG. 6 in accordance with an embodiment of the present invention.
Figure 7B:
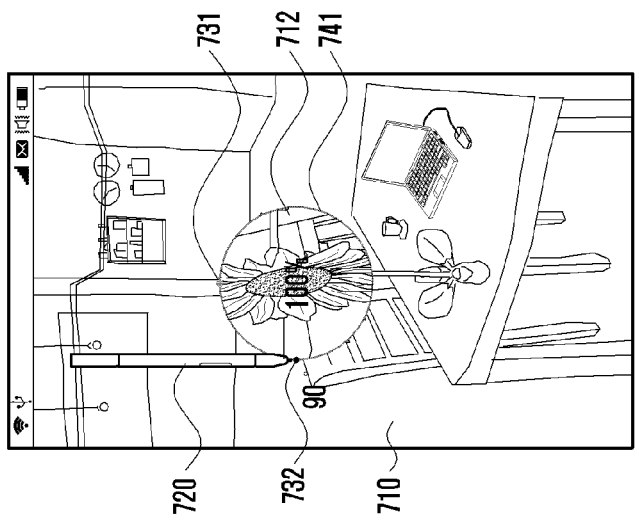
Figure 7A:
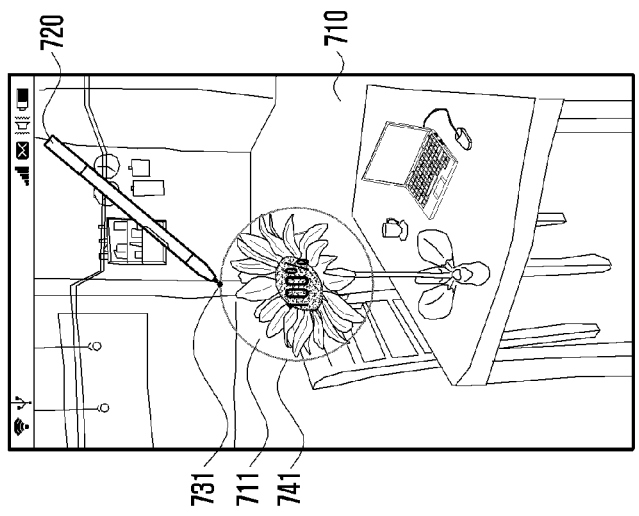

FIG. 6 is a flowchart illustrating an image rotation method in accordance with an embodiment of the present invention, and FIGS. 7A-7C are screens illustrating the image rotation method in FIG. 6 in accordance with an embodiment of the present invention.

Referring to FIGS. 6 and 7A-7C, at step 610, the control unit 160 controls the display unit 110 so that target content, for example, a photograph 710 such as that shown in FIG. 7A, is displayed.

At step 620, when a tap & long touch is detected from the touch panel 111, the control unit 160 determines that a trigger gesture has been generated.

At step 630, the control unit 160 controls the display unit 110 so that a guide is displayed. Referring to FIG. 7A, the guide includes a frame 741, in which a point 731 touched by the pen point of a pen 720 is one point on the circumference, and the reference magnification information (e.g., 100%) displayed within the frame 741.

When a gesture is detected from the touch panel 111 after the guide is displayed, the control unit 160 determines whether or not the detected gesture is a rotation gesture at step 640. If it is determined that the detected gesture is not a rotation gesture, the method jumps to step 660.

If, in step 640, it is determined that the detected gesture is a rotation gesture, the control unit 160 controls the display unit 110 so that the rotation of the guide is displayed at operation 650. Referring to FIG. 7B, when the pen point 731 of the pen 720 is rotated along the frame 741 to point 732, the control unit 160 generates a copy of the portion 711 of the photograph within the frame 741 in FIG. 7A, controls the display unit 110 to display the copy 712 rotated by the same amount of rotation as of the pen point from 731 to 732, as shown in FIG. 7B, and controls the display unit 110 so that a rotation angle (e.g., 90 degrees) is displayed adjacent to the second touch point 732.

At step 660, the control unit 160 determines whether the touch or contact of the touch input means is released. If it is determined that contact has been released, the method jumps back to step 640. If it is determined that the touch of the touch input means is released, the control unit 160 controls the display unit 110 to terminate the display of the guide and to instead display the target content rotated at the same angle as that of the pen point's movement from 731 to 732 at operation 670 as shown in FIG. 7C. Referring to FIGS. 7B and 7C, when the touch of the pen point of the pen 720 is released from the second touch point 732, the control unit 160 controls the display unit 110 to terminate the display of the frame 741 and the second copy 712 as shown in FIG. 7B, and controls the display unit 110 to display a second photograph 750 comprising the first photograph 710 rotated at the same angle as that of the pen point's movement from 731 to 732.

Figure 8:
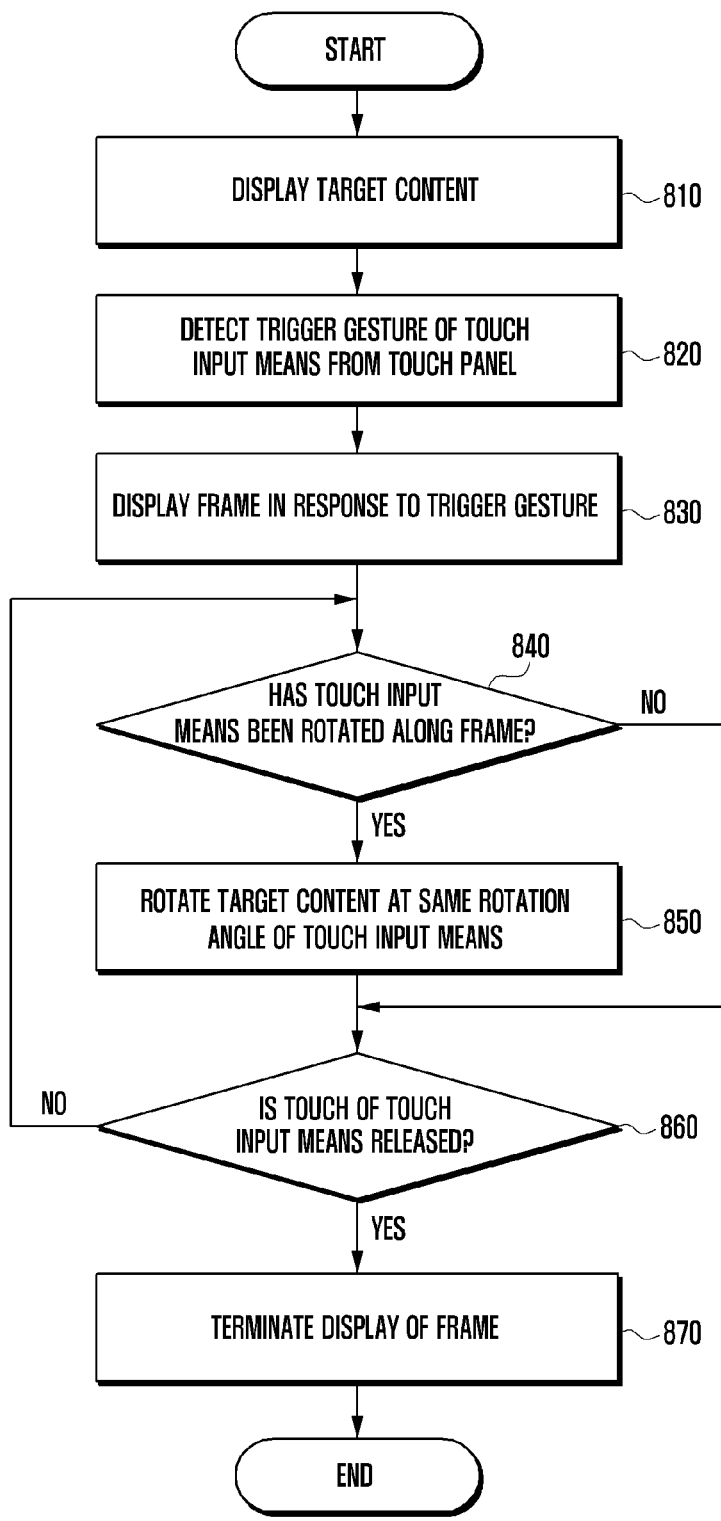
FIG. 8 is a flowchart illustrating an image rotation method in accordance with another embodiment of the present invention.

FIG. 8 is a flowchart illustrating an image rotation method in accordance with another embodiment of the present invention, and FIGS. 9A-9B are screens illustrating the image rotation method in FIG. 8 in accordance with another embodiment of the present invention.

Referring to FIGS. 8 and 9A-9B, at step 810, the control unit 160 controls the display unit 110 so that target content, for example, a photograph 910 such as that shown in FIG. 9A, is displayed.

At step 820, when a tap & long touch is detected from the touch panel 111, the control unit 160 determines that a trigger gesture has been generated.

At step 830, the control unit 160 controls the display unit 110 so that a frame 941, in which a touch point 931 is one point on the circumference, is displayed as shown in FIG. 9A. Furthermore, at step 830, the control unit 160 controls the display unit 110 so that magnification information "100%" is displayed.

When a gesture is detected from the touch panel 111 after the frame 941 is displayed, the control unit 160 determines whether the detected gesture is a rotation gesture by which the touch input means (e.g., pen 920) has been rotated along the frame 941 at step 840. If it is determined that the detected gesture is not such a rotation gesture, the method jumps to step 860.

If, in step 840, it is determined that the detected gesture is a gesture of the touch input means rotating along frame 941, the control unit 160 controls the display unit 110 to display the target content rotated at the same angle as the touch input means rotated along frame 941 at step 850. Referring to FIG. 9B, when the pen point of the pen 920 is rotated along the frame 941 from point 931 to point 932, the control unit 160 controls the display unit 110 to display a second photograph 950 comprising the first photograph 910 rotated at the same angle as the pen point rotation from 931 to 932. Furthermore, the control unit 160 controls the display unit 110 to display the rotation angle "90 degrees" adjacent to the second touch point 932.

At step 860, the control unit 160 determines whether or not the touch or contact of the touch input means is released. If the contact of the touch input means has not been released, the method jumps back to step 840. If, at step 860, it is determined that the touch of the touch input means is released, the control unit 160 controls the display unit 110 in step 870 to terminate the display of the frame 941, the magnification information, and the rotation angle.

Figure 10:
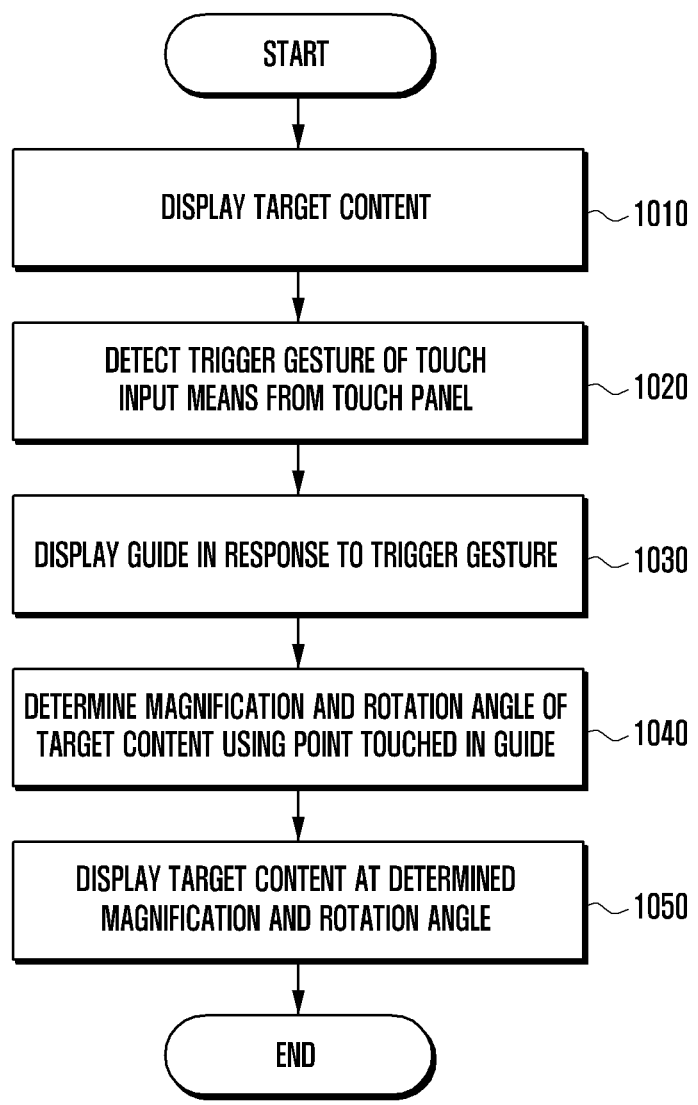
FIG. 10 is a flowchart illustrating an image zooming and rotation method in accordance with yet another embodiment of the present invention.

FIG. 10 is a flowchart illustrating an image zooming and rotation method in accordance with yet another embodiment of the present invention, and FIGS. 11A-11D are screens illustrating the image zooming and rotation method in FIG. 10 in accordance with yet another embodiment of the present invention.

Figure 11A:
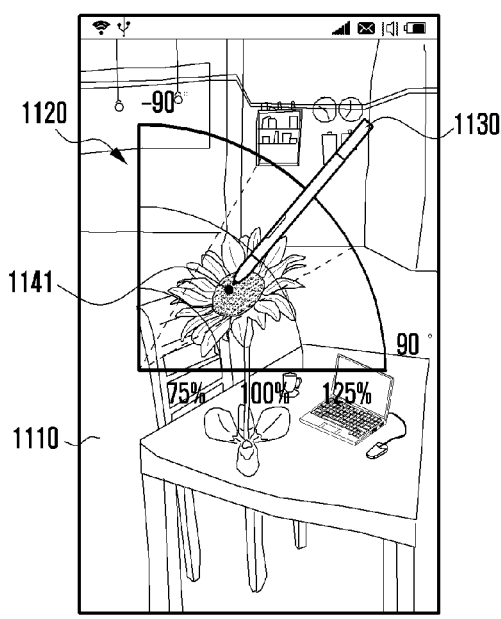
FIGS. 11A-11D are screens illustrating the image zooming and rotation method in FIG. 10 in accordance with yet another embodiment of the present invention.

Referring to FIGS. 10 and 11A-11D, at step 1010, the control unit 160 controls the display unit 110 so that target content, for example, a photograph 1110, such as that shown in FIG. 11A, is displayed.

At step 1020, when a tap & long touch is detected from the touch panel 111, the control unit 160 determines that a trigger gesture has been generated.

In response to the trigger gesture, the control unit 160 controls the display unit 110 so that a guide 1120, such as that shown in FIG. 11A, is displayed at operation 1030. The guide 1120 can have a fan shape (in another embodiment, the guide 1120 may have another shape) and includes magnification information and angle information as shown in FIGS. 11A-11D.

Figure 11B:
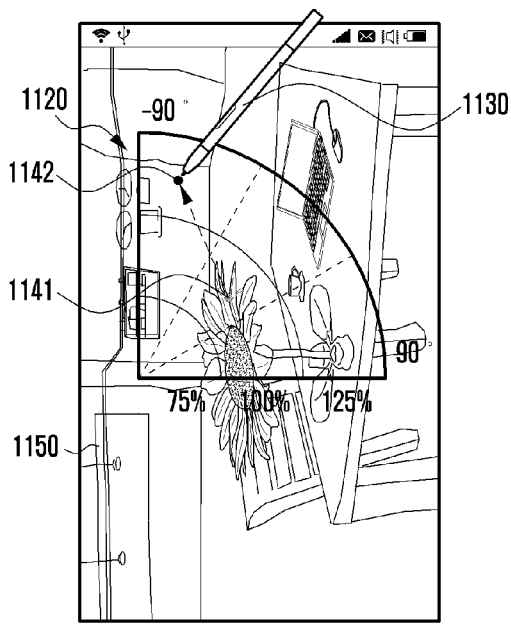
Figure 11C:
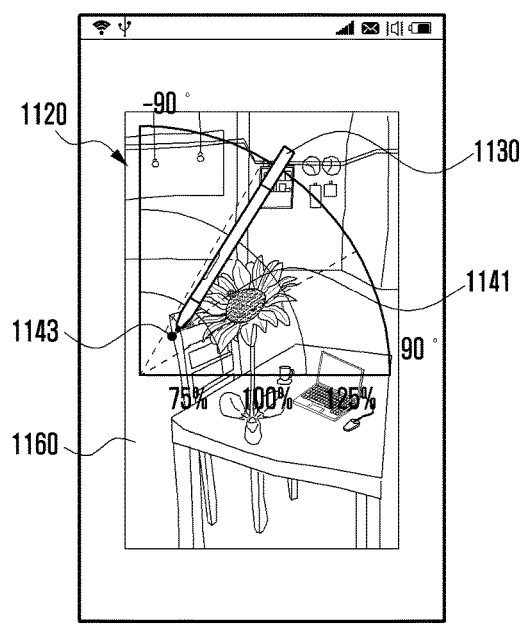
Figure 11D:
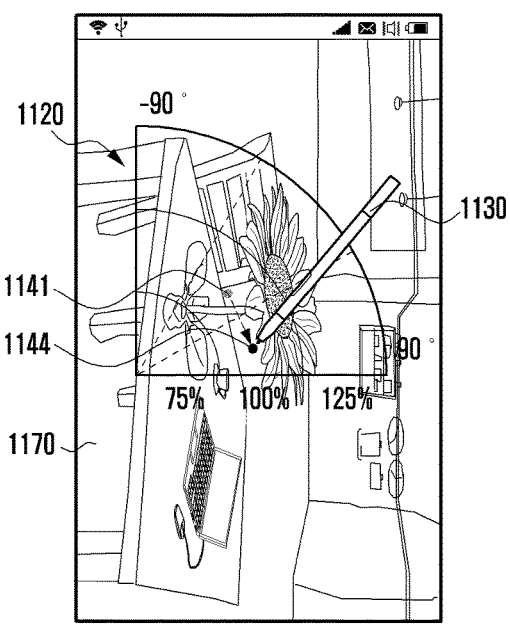

At step 1040, the control unit 160 determines the magnification and rotation angle of the target content using a point touched in the guide 1120. At step 1050, the control unit 160 controls the display unit 110 to display the target content at the determined magnification and rotation angle. Referring to FIG. 11B, the control unit 160 detects a zooming gesture in which a point touched by a pen 1130 is changed from a first point 1141 to a second point 1142 on the touch panel 111. Here, the zooming gesture can be a gesture in which the pen point of the pen 1130 is moved from the first point 1141 to the second point 1142 by remaining in contact with the guide 1120 or can be a gesture in which the touch of the pen point of the pen 1130 is removed from contact at the first point 1141 and then moved to touch or re-contact guide 1120 at the second point 1142. In response to the zooming gesture, the control unit 160 controls the display unit 110 to display a photograph 1150 comprising photograph 1110 rotated 90 degrees counterclockwise and enlarged at a magnification of 125%. Referring to FIG. 11C, when the touch point is changed from the first point 1141 to a third point 1143, the control unit 160 controls the display unit 110 to display a photograph 1160 comprising photograph 1110 reduced at a magnification of 75%. Referring to FIG. 11D, when the touch point is changed from the first point 1141 to a fourth point 1144, the control unit 160 controls the display unit 110 to display a photograph 1170 comprising photograph 1110 that has been rotated 90 degrees clockwise is displayed.

Figure 12:
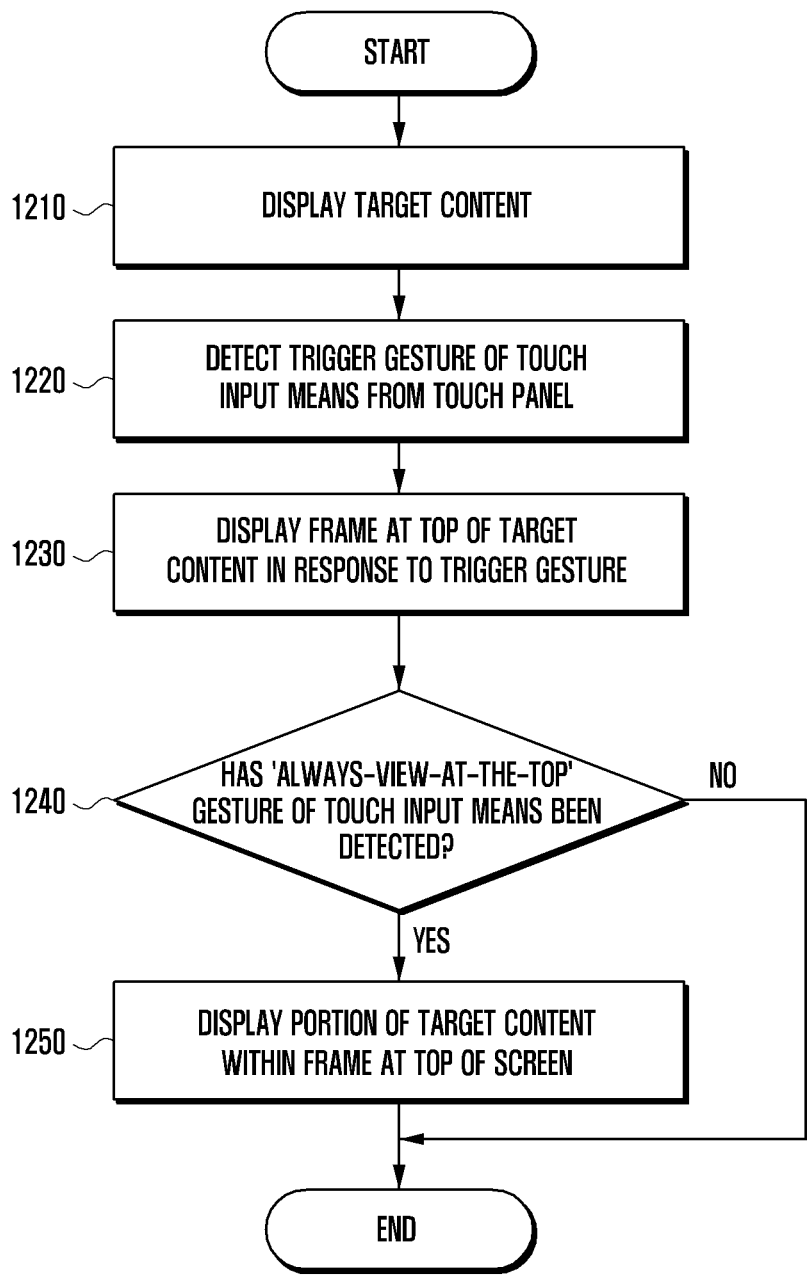
FIG. 12 is a flowchart illustrating a method of setting an 'ALWAYS-VIEW-AT-THE-TOP' function in accordance with an embodiment of the present invention.

FIG. 12 is a flowchart illustrating a method of setting an 'ALWAYS-VIEW-AT-THE-TOP' function in accordance with an embodiment of the present invention, and FIGS. 13A-13C are screens illustrating the method of setting the 'ALWAYS-VIEW-AT-THE-TOP' in FIG. 12 in accordance with an embodiment of the present invention.

Referring to FIGS. 12 and 13A-13C, at step 1210, the control unit 160 controls the display unit 110 so that target content, for example, a photograph 1310, such as that shown in FIG. 13A, is displayed.

At step 1220, when a tap & long touch is detected from the touch panel 111, the control unit 160 determines that a trigger gesture has been generated.

In response to the trigger gesture, the control unit 160 controls the display unit 110 so that a frame is displayed on top of the target content at step 1230. Referring to FIG. 13A, when the pen point of a pen 1340 taps & long touches a first point 1351, a frame 1321 is displayed in which the first point 1351 is one point on the circumference of the frame. Furthermore, reference magnification information 100% is displayed within the frame 1321. Referring to FIG. 3B, when the pen point of the pen 1340 moves out of the frame 1321 from point 1351 to point 1352, a new frame 1322, in which the second point 1352 is one point on the circumference, is displayed, the portion 1311 of the photograph within the first frame 1321 in FIG. 3A is enlarged to fit the area of the second frame 1322, and magnification information "125%" about the enlarged photograph 1312 is displayed within the first frame 1321.

When a gesture is detected from the touch panel 111 after the frame is displayed over the target image, the control unit 160 determines whether or not the detected gesture is an 'ALWAYS-VIEW-AT-THE-TOP' gesture at step 1240. For example, the 'ALWAYS-VIEW-AT-THE-TOP' gesture can be a gesture in which a user presses a button installed in the pen 1340. When a user presses the button installed in the pen 1340, the touch panel 111 detects this gesture, generates an event related to the detected gesture, and transfers the event to the control unit 160.

In response to the 'ALWAYS-VIEW-AT-THE-TOP' gesture, the control unit 160 generates a copy of the portion of the target content within the frame and controls the display unit 110 to display the generated copy at the top of a screen at step 1250. Referring to FIGS. 13B and 13C, when the 'ALWAYS-VIEW-AT-THE-TOP' gesture is detected in the state in which the pen point of the pen 1340 has touched the second point 1352, a copy button 1361, a return button 1362, and an end button 1362 are displayed at the top of the enlarged photograph 1312. When the copy button 1361 is touched, the enlarged photograph 1312 is copied. When a button installed in the pen 1340 is selected in the state in which any point 1371 within a message write window 1370 has been touched by the pen point of the pen 1340, the enlarged photograph 1312 is displayed in the message write window 1370. When the return button 1362 is touched, the photograph 1310 is displayed on the entire screen. When the end button 1363 is touched, the 'ALWAYS-VIEW-AT-THE-TOP' is terminated. That is, the display of the enlarged photograph 1312 and the buttons 1361 to 1363 is terminated.

In accordance with the method of editing content and the display device according to the embodiments of this invention, a user can edit displayed content intuitively and conveniently.

The content editing (i.e., zooming, rotating, or copying and pasting) method according to the present invention can be implemented in the form of a computer-executable program stored in a non-transitory computer-readable storage medium. The computer readable storage medium may store the program commands, data files, and data structures in individual or combined forms. The program commands recorded in the storage medium may be designed and implemented for various embodiments of the present invention as is known by those of ordinary skill in the computer software field. The computer-readable storage medium may include magnetic media such as a hard disk, a floppy disk and a magnetic tape, optical media including a Compact Disc (CD) ROM and a Digital Video Disc (DVD) ROM, a magneto-optical media such as a floptical disk, and a hardware device designed for storing and executing program commands, such as ROM, RAM, and flash memory. The programs commands may be in a high-level language code executable by computers using an interpreter as well as machine language codes created by a compiler. The aforementioned hardware device can be implemented with one or more software modules for executing the operations of the various embodiments of the present invention.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of editing content in a display device having a touch panel installed in a screen, the method comprising:
   displaying target content on an image in the screen;
   displaying a guide on top of the target content, and inside of the image, in response to a trigger gesture by a touch input means on a point near the target content, the displayed guide comprising:
      an outer boundary on which lies the point contacted by the touch input means; and
      a first magnification percentage indicating a magnification within the outer boundary;
   zooming and displaying a zoomed guide in response to a zooming gesture by the touch input means on the guide, the displayed zoomed guide comprising:
      the outer boundary changed in size according to the zooming gesture; and
      a second magnification percentage indicating a new magnification within the outer boundary changed in size; and
   terminating a display of the zoomed guide and displaying the target content at a magnification identical to the zoomed guide, in response to a release of contact of the touch input means on the guide.

2. The method of claim 1, wherein zooming and displaying the zoomed guide comprises:
   when the zooming gesture is outward, displaying a frame where the original outer boundary is located and enlarging a portion of the target content within the original outer boundary by an enlargement magnification to fit the zoomed-out outer boundary; and
   when the zooming gesture is inward, displaying a frame where the original outer boundary is located and reducing a portion of the target content within the original outer boundary by a reduction magnification to fit the zoomed-in outer boundary.

3. The method of claim 1, wherein the trigger gesture comprises any one of a tap & long touch, a tap & touch, a double tap, a multi-touch, a long touch, and a gesture of drawing a circle.

4. The method of claim 1, further comprising:
   rotating the guide in response to a rotation gesture by the touch input means on the guide; and
   terminating a display of the rotated guide in response to a release of contact of the touch input means on the guide and displaying the target content at a rotation angle identical with a rotation angle of the rotated guide.

5. The method of claim 1, further comprising always displaying a copy identical with a portion of the target content within a frame of the guide on the screen in response to an 'ALWAYS-VIEW-AT-THE-TOP' gesture.

6. The method of claim 5, further comprising displaying the copy in a message write window.

7. The method of claim 1, further comprising:
   rotating the target content in response to a gesture in which the touch input means is rotated along the outer boundary of the guide.

8. A mobile terminal, comprising:
   a display unit comprising a touch;
   a non-transitory computer-readable medium; and
   a processor,
   wherein the processor, when executing instructions stored on the non-transitory computer-readable medium, controls the mobile terminal to perform the steps of:
      displaying target content on an image in a screen;
      displaying a guide on top of the target content, and inside of the image, in response to a trigger gesture by a touch input means on a point near the target content, the displayed guide comprising:
         an outer boundary on which lies the point contacted by the touch input means; and
         a first magnification percentage indicating a magnification within the outer boundary;
      zooming and displaying a zoomed guide in response to a zooming gesture by the touch input means on the guide, the displayed zoomed guide comprising:
         the outer boundary changed in size according to the zooming gesture; and
         a second magnification percentage indicating a new magnification within the outer boundary changed in size; and
      terminating a display of the zoomed guide and displaying the target content at a magnification identical to the zoomed guide in response to a release of contact of the touch input means on the guide.

* * * * *